Patented Oct. 29, 1940

2,219,587

UNITED STATES PATENT OFFICE 2,219,587

PRINTING PLATE COMPOSITION

Clarence E. Boutwell, Birmingham, Ala.

No Drawing. Application July 31, 1939,
Serial No. 287,559

17 Claims. (Cl. 41—25)

This application is a continuation in part of my previously filed application, Serial No. 64,163, filed February 15, 1936.

My invention relates to printing plates, and has for its object to provide a device of this character which shall be extremely durable, economical of manufacture, and simple in its adaptation or use, and which may be employed in any type of printing work, and particularly in lieu of electrotype or stereotype plates, metal embossing panels, and similar plates used by printers and embossers.

A further object of my invention is to provide a plastic composition, which, under the influence of heat and pressure, may be molded to reproduce in detail any printing setup upon which it is impressed, and form a printing plate with an extremely hard, durable surface having superior ink distributing properties.

As is well known in the art to which my invention relates, printing plates, such as electrotypes and embossing plates, are expensive, require considerable skilled labor to produce, and the process of preparing them consumes from three hours to several hours. The metal employed for the printing surfaces, such as copper or nickel, being malleable, the plates break down or flow under use, and are liable to be ruined by being dropped or by being accidentally struck with a hard object so as to deface the printing surface.

By the use of my improved composition, a plate may be produced in a few minutes which, in detail of reproduction, is superior to the electrotype, which has superior ink distributing qualities, and which has an exceedingly hard tough surface, which is not liable to damage by use, by rough handling, or by being accidentally struck.

Printing plates made from plastic compositions have heretofore been proposed in the art, but the use of such plates has been greatly limited due to the fact that the substances heretofore proposed are liable to shrinkage and to warping, would become brittle and break down in service or else flow and become distorted when printing, and are not readily wettable by oily printing inks, such as are employed with metallic plates. Also, with some substances heretofore proposed, the printing inks having an oil base have a plasticizing or solvent effect on the composition causing it to flow in service. (Electrotypers' Bulletin, May, 1937; pages 29–36.)

I have discovered that a plastic binding material moldable under heat and pressure, having incorporated therein in suitable proportions, as hereinafter set forth, a plasticizer and a metal compound having the property of providing the requisite hardness and strength and a surface suitable for holding and distributing ink, may be formed into a sheet which is admirably adapted for the production of printing plates. When a sheet so formed is subjected to pressure under the influence of heat, it produces a surface of extreme hardness and durability. The metal compound in combination with the plasticizer in proper proportions affords the requisite hardness for the surface of the plate, and has the property of being wetted by oily ink, making it capable of holding the printing ink without smearing and yet retain the necessary sharpness of outline requisite to reproduce faithfully minute details of a design. This also permits the use of a thinner ink than may be used with other plates, including metal plates, and my improved plate is thus capable of more satisfactory detail reproduction.

The plastic binding material chosen is preferably one that is readily soluble in a volatile solvent, such as acetone or alcohol, and one which may be molded under the influence of heat and pressure. I have found that a fire resistant plastic cellulosic compound, such as cellulose acetate with suitable plasticizers in the right proportions, is admirably suited for my improved product. While pyroxylin may be mixed with plasticizers and mineral filler, as hereinafter described, and molded to form a printing plate, it is not so satisfactory as cellulose acetate, and I have found that its inflammability renders the necessary machining operations hazardous.

The use of plasticizers to counteract the tendency of cellulosic esters to become brittle with age is well known. I have found that the selection of plasticizers compatible with each other and with cellulose acetate, the mineral compound incorporated in the mixture, and the proportions employed, are highly important considerations in producing a printing plate having sufficient hardness, toughness and durability to stand up under the severe service conditions to which such a plate is ordinarily subjected.

The mixture of plasticizers which I employ imparts to the plastic mixture a hardness and strength together with a softening point sufficiently high for the material not to flow at temperatures and pressures encountered in service. The plasticizers must have as high a boiling point as possible in order to avoid loss in the molding operation. They must also have low vapor pressures at ordinary temperatures so that they will not have a high evaporation rate and thus lose plasticizer and cause shrinkage, warping and brittleness when the product is in storage or not being used for some time. The plasticizers must be non-hygroscopic, otherwise the material will absorb moisture from the atmosphere and deteriorate. In addition, the plasticizers chosen should impart hardness to the material without too great a sacrifice of tensile strength and resiliency, so that fine details of the printing setup will not yield in printing; and finally the plasticizers should impart fire resistance to the material so that it may be safely molded at relatively high temperatures and subjected to machining operations.

I have found that a mixture of the following plasticizers with cellulose acetate and a suitable metal compound produces a material having ideal characteristics for forming a printing plate:

| | Percent by volume of finished product | Boiling point, C°. |
|---|---|---|
| 1 Methyl phthalyl ethyl glycollate (Santicizer M17) | 3.24–4.86 | mm. 189/5 |
| 2 Butyl phthalyl butyl glycollate (Santicizer B16) | 6.99–10.51 | 219/5 |
| 3 Triphenyl phosphate | 9.63–14.47 | 245/11 |

It will be noted that the boiling points of all of the above plasticizers are very high compared to the molding temperatures of cellulose acetate. Also the vapor pressures at atmospheric temperatures are very low. The composition thus formed does not lose plasticizer either in molding or in storage. The first two plasticizers produce moldability suitable for a printing plate and impart toughness to the plate. Triphenyl phosphate provides hardness and strength. It will be noted that the latter, in weight, comprises substantially the sum of the weights of the other two plasticizers.

In place of the Santicizer M17, I may substitute ethyl phthalyl glycollate. In place of the Santicizer B16 I may use a mixture of ortho and para toluene ethyl sulfonamides, a mixture of ortho and para toluene sulfonamides, ortho-cresyl para-toluene sulfonate, or other similar sulfonamide condensation products compatible with cellulose acetate and with the other plasticizers employed. In lieu of triphenyl phosphate, tri-butyl phosphate may be substituted. It will be understood, however, that where substitutions are employed the proportions hereinafter given would necessarily have to be varied in order to produce the required softening point and molding temperature. It will also be apparent that any plasticizers chosen must be compatible with cellulose acetate and with each other in the proportions employed.

For the best results, I have found that the mixture of cellulose acetate and plasticizers should have a softening point in the neighborhood of 275° F. to 295° F., and a molding temperature around 350° F. If the softening point is above 295° F., it is too brittle or has too low a tensile strength for use in a printing plate. If the softening point be much below 275° F., the material is liable to cold flow in service and thus have a relatively short life. Generally speaking, if the plasticizers are selected from the group hereinbefore given and the total employed is much below 17% of the volume of the final product, it will be found to be too brittle, whereas if the total plasticizer employed is much above 27% by volume, the final product is liable to cold flow in service.

I have found that the metal compounds known as the best bases for oil paints, notably basic lead carbonate and iron oxide, are the metal compounds best suited for making my improved printing plate. The qualities of these compounds are such that the strength, hardness and durability of the plastic in which they are incorporated are enhanced. When incorporated in the proportions hereinafter specified, the particles appear on the surface of the plate and have the quality of being readily wetted by and of retaining ordinary printing ink, particularly that having an oil base. The compounds mentioned are difficult to disperse in a solution of cellulose acetate, further indicating that they are difficultly wettable in the cellulosic binder. I have also noted that my improved printing plates distribute the ink better and print better after being mounted in a printing press and running for a short period of time, indicating that whatever molecular film of plastic which may overlie the crystals at the beginning is worn away, leaving the crystals of the metal compound exposed to be wetted by the ink.

I have also produced moldable plates with other compounds and metals, such as zinc oxide, calcium carbonate, calcium sulphate, manganese carbonate, kaolin, barium sulphate, magnesium oxide, magnesium carbonate, alum, metallic aluminum, tin oxide, and manganese oxide, but find such plates less durable, in that they are more brittle, or are else subject to cold flow in service, and have less ink retaining and distributing properties than those produced with lead carbonate and iron oxide.

I have found that the lead carbonate and iron oxide have qualities for this purpose superior to those mentioned in the last group, or to the pure metals in powdered form. While I have had no means at hand for accurately determining the relative wetting properties of the metal compounds in relation to the cellulose binding material, it is my observation that the metal compounds which are the more difficultly wetted in a solution of cellulose acetate produce the tougher and harder plates.

For all round purposes, a printing plate made from my improved mixture using lead carbonate or iron oxide, or a mixture of the two, is preferable. The surface thus produced appears to be the best adapted for holding most printing inks. Also the plate is tougher, harder, and more durable than those made with other metallic compounds. I have run a printing plate comprising a combination of type and half tone and made from cellulose acetate, plasticizer, and 60% by weight of lead carbonate, for more than one million impressions with no appreciable show of wear. Tests made by me indicate that iron oxide has similar properties. The compound employed should be in finely divided form, such as used in producing paints, and before using should be passed through a fine screen so that all lumps or large particles are removed.

Following is a specific example, by way of illustration, of a preferred composition forming my improved printing plate:

| | Parts by weight | Percent by weight | Parts by volume | Percent by volume |
|---|---|---|---|---|
| Cellulose acetate | 70 | 35.0–25.0 | 53.0 | 56.0–49.0 |
| Plasticizers: | | | | |
| Santicizer M17 | 5 | 2.5–1.75 | 4.2 | 4.4–3.9 |
| Santicizer B16 | 10 | 5.0–3.5 | 9.1 | 9.5–8.4 |
| Triphenyl phosphate | 15 | 7.5–4.75 | 12.5 | 13.1–11.4 |
| Lead carbonate | 100–185 | 50.0–65.0 | 16.0–30.0 | 17.0–28.0 |

Where iron oxide or a mixture of lead carbonate and iron oxide is employed as the metal compound, the weight ratios will vary according to the specific gravities and the bulking values of the compounds. Generally speaking the volume ratios will be substantially the same for all compounds employed.

I have found that the proportions of the metal compound employed as herein set forth are very important. If less than 16.0% by volume (50% by weight of lead carbonate) be employed, the resulting plate will be likely to cold flow in service. On the other hand, if more than 30.0% by volume of metal compound (65% by weight of lead carbonate) be employed, the plate will be too brittle and the characters are likely to break down.

In the practical carrying out of my invention, I first place in a suitable mixing vessel one equivalent weight of acetone or other suitable solvent for each unit weight of the finished product. Cellulose acetate is then added to the solvent and the mechanical mixer being run until it slowly, is thoroughly dissolved in the solvent without lumping. The plasticizers are then added to the solution of cellulose acetate in the solvent and the mixing continued until the plasticizers are thoroughly incorporated. Depending on the type of mixer employed, this should require only a short period of time. As soon as the plasticizers are thoroughly incorporated into the mix, the metal compound is then added slowly and mixing continued. Inasmuch as the compounds are difficultly wettable in the mixture, they are difficult to disperse and, depending upon the type of mixer, may require from 24 to 48 hours for thorough dispersion in the batch. As soon as the metal compound is thoroughly dispersed, the mixture is extruded into thin sheets of from .005 to .007 inch in thickness and allowed to dry. If air at a temperature of 90° to 100° C. be passed over the sheets, they may be dried in a few minutes. If thicker sheets are made, the solvent may be locked in by surface drying and a considerable aging time may be necessary to rid the mixture of the solvent.

After the sheets have become thoroughly dry, they are placed in layers or laminations in a suitable press, heated to molding temperature, which is in the neighborhood of 350° F., and pressed into a sheet of suitable thickness for forming a printing plate. For practical purposes, this should be about one-eighth of an inch in thickness.

In forming the plate, a suitable matrix is first formed in any manner known to those skilled in the art, of a sufficiently hard substance to withstand pressure and capable of withstanding heat. Suitable matrices may be made of plaster of Paris, phenolic plastic compositions, impression metal or other substance of corresponding hardness. This matrix is placed in a press, such as a copying press, hydraulic press, or other suitable press, having heating and cooling means associated therewith. One or both of the platens of the press are then heated to a temperature of from 330° F. to 360° F., and over the matrix is placed a sheet of my improved composition prepared as hereinbefore described. The sheet is pressed into the matrix and the plate is formed. The press is then cooled and the plate stripped from the matrix. It is next trimmed, routed and mounted on a suitable backing. If the plate is to be used in a rotary press it may be heated and curved over a suitable form to fit the cylinder on which it is to be mounted.

I have found that printing plates made of the compositions, and in accordance with my improved process, are extremely durable, and are not liable to damage by being accidentally struck or dropped. For example, in the operation of a printing press with one of my improved plates, the paper strippers of the press accidentally struck the plate a number of times without damaging in any way the printing surface of the plate. While the filler does not appear to enter into chemical combination with the binding material, it imparts to it a hardness and toughness far beyond that possessed by the binding material alone. Further, the compositions herein described may be machined more readily than can cellulose acetate alone, rendering them adaptable for uses other than printing plates.

I have found also that my improved printing plates are particularly adapted for reproducing details of impressions, such as fine lines and fine screen photo etchings, or any other details known to the printing art.

While I have described my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A composition for making relief printing plates and the like comprising a sheet of material deformable under heat and pressure and composed of a metal compound approximating one-fourth of the volume thereof and selected from lead carbonate and iron oxide, a cellulosic plastic approximating 49% to 56% by volume, and a non-volatile plasticizer of from 17% to 28% by volume.

2. A composition for making printing plates and the like comprising a metal compound in an amount equivalent to approximately one-fourth the volume thereof selected from lead carbonate and iron oxide, cellulose acetate in an amount equivalent to 49% to 56% of the volume thereof, and the remainder a non-volatile plasticizer to give the mixture a softening point of approximately 290° F. and a molding temperature of approximately 350° F.

3. A composition for making printing plates and the like comprising a solid mineral compound comprised of a mixture of lead carbonate and iron oxide in an amount equivalent to approximately one-fourth the volume thereof, cellulose acetate in an amount equivalent to 49% to 56% of the volume thereof, and the remainder a non-volatile plasticizer to give the mixture a softening point of approximately 290° F. and a molding temperature of approximately 350° F., the plasticizer comprising a mixture of organic glycollates and an organic phosphate compatible with cellulose acetate and with each other.

4. A composition for making printing plates and the like comprising a sheet of material composed of carbonate of lead 17.0% to 28% by volume in suspension in cellulose acetate, and a plasticizer having a boiling point considerably above 350° F. and a low vapor pressure whereby it is non-volatile at atmospheric temperatures.

5. A composition for making printing plates and the like comprising cellulose acetate 49% to 56% by volume, iron oxide approximately one-fourth by volume, and the remainder a mixture of plasticizers giving to the finished product a softening point in the neighborhood of 290° F. and a molding temperature in the neighborhood of 350° F., said plasticizers having boiling points considerably above the molding temperatures of the composition and being non-volatile at atmospheric temperatures.

6. A composition for making printing plates and the like comprising cellulose acetate 49% to 56% by volume, a metal compound selected from lead carbonate and iron oxide approximately one-fourth by volume, and the remainder a mixture of plasticizers giving to the finished product a softening point in the neighborhood of 290° F. and a molding temperature in the neighborhood of 350° F., said plasticizers having boiling points considerably above the molding temperatures of the composition and being non-volatile at atmospheric temperatures.

7. A composition for making printing plates and the like comprising cellulose acetate 49% to 56% by volume, lead carbonate approximately one-fourth by volume, and the remainder a mixture of plasticizers giving to the finished product a softening point in the neighborhood of 290° F. and a molding temperature in the neighborhood of 350° F., said plasticizers having boiling points considerably above the molding temperatures of the composition and being non-volatile at atmospheric temperatures.

8. A composition for making printing plates and the like comprising cellulose acetate 49% to 56% by volume, a metal compound comprising lead carbonate and iron oxide difficultly wettable in the cellulose acetate and readily wettable by oily printing ink and constituting approximately one-fourth by volume, and the remainder a mixture of plasticizers giving to the finished product a softening point in the neighborhood of 290° F. and a molding temperature in the neighborhood of 350° F., said plasticizers having boiling points considerably above the molding temperatures of the composition and being non-volatile at atmospheric temperatures.

9. A composition for making printing plates and the like comprising cellulose acetate 49% to 56% by volume, a metal compound comprising lead carbonate and iron oxide 17% to 28% by volume difficultly wettable in the cellulose acetate and readily wettable by printing ink, and the remainder a mixture of plasticizers giving to the finished product a softening point in the neighborhood of 290° F. and a molding temperature in the neighborhood of 350° F., said plasticizers having boiling points considerably above the molding temperatures of the composition and being non-volatile at ordinary temperatures.

10. A printing plate composed of a solid metal compound selected from lead carbonate and iron oxide in finely divided form equivalent to 17% to 28% by volume thereof, cellulose acetate in an amount equivalent to 49% to 56% by volume thereof, and the remainder a mixture of plasticizers which give to the plate a softening point considerably above 200° F.

11. A printing plate composed of a metal compound comprising lead carbonate and iron oxide in finely divided form equivalent to 17% to 28% by volume thereof, cellulose acetate in an amount equivalent to 49% to 56% by volume thereof, and the remainder a mixture of plasticizers comprising a mixture of methyl phthalyl ethyl glycollate, butyl phthalyl butyl glycollate, and triphenyl phosphate.

12. A printing plate composed of a metal compound selected from lead carbonate and iron oxide in finely divided form equivalent to 17% to 28% by volume thereof, cellulose acetate in an amount equivalent to 49% to 56% by volume thereof, and the remainder a mixture of plasticizers comprising a mixture of methyl phthalyl ethyl glycollate, butyl phthalyl butyl glycollate, and triphenyl phosphate the triphenyl phosphate comprising approximately as much by weight as the sum of the weights of the other two plasticizers.

13. A relief printing plate composed of carbonate of lead in an amount equivalent to 18% to 28% of the volume thereof, a plastic fire resistant cellulosic binder amounting to 48% to 56% of the volume thereof, and the remainder a mixture of plasticizers compatible with cellulose acetate and with each other giving to the printing plate a molding point of approximately 350° F.

14. A printing plate composed of carbonate of lead in an amount equivalent to 17% to 28% of the volume thereof, cellulose acetate amounting to 49% to 56% of the volume thereof, and the remainder a mixture of plasticizers compatible with cellulose acetate and with each other giving to the printing plate a molding temperature of approximately 350° F.

15. A printing plate comprising a sheet composed of a metal compound selected from lead carbonate, and iron oxide in finely divided form in an amount equivalent to 17% to 28% of the volume thereof, a thermoplastic fire resistant cellulosic binder for said metallic compound through which it protrudes to be wetted by the ink and amounting to 49% to 56% of the volume of the plate, and the remainder a mixture of plasticizers compatible with cellulose acetate, non-volatile at atmospheric temperatures, and giving to the composition a molding temperature of approximately 350° F.

16. A relief printing plate in the form of a sheet comprising by volume 17% to 28% of one or more mineral compounds in finely divided form which are readily wettable by printing ink and which are selected from the following: lead carbonate and iron oxide; and 49% to 56% of a thermoplastic fire resistant cellulosic binder in which the selected compound or compounds are so difficultly wettable that they are exposed at the surface of the binding material to be wetted by the ink in the printing operation, and the remainder a mixture of plasticizers compatible with the cellulosic binding material non-volatile at atmospheric temperature and giving to the plate a molding temperature around 350° F.

17. A composition for making printing plates and the like comprising a sheet of material composed of a metal compound of the group consisting of carbonate of lead and iron oxide amounting to 17% to 28% by volume of the composition in suspension in a cellulosic plastic, and a plasticizer having a boiling point considerably above 350° F. and a low vapor pressure whereby it is non-volatile at atmospheric temperatures.

CLARENCE E. BOUTWELL.